May 26, 1970 W. A. GRIFFITH 3,514,283
PROCESS FOR ABSORPTION OF UNDESIRABLE GASEOUS EFFLUENTS
Filed Jan. 30, 1968 3 Sheets-Sheet 1
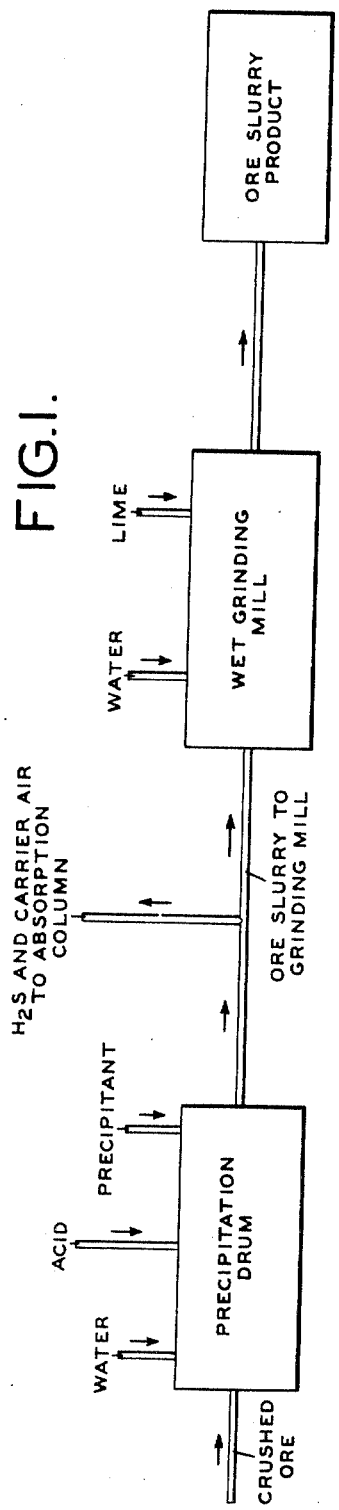
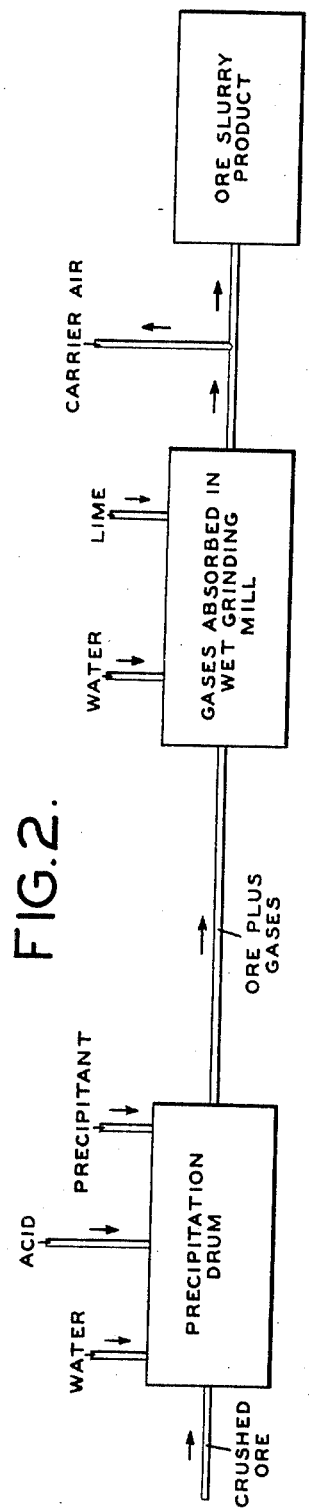

May 26, 1970  W. A. GRIFFITH  3,514,283
PROCESS FOR ABSORPTION OF UNDESIRABLE GASEOUS EFFLUENTS
Filed Jan. 30, 1968  3 Sheets-Sheet 3

3,514,283
PROCESS FOR ABSORPTION OF UNDESIRABLE GASEOUS EFFLUENTS
William A. Griffith, Morenci, Ariz., assignor to Phelps Dodge Corporation, New York, N.Y., a corporation of New York
Filed Jan. 30, 1968, Ser. No. 701,725
Int. Cl. C22b 3/00
U.S. Cl. 75—101                               5 Claims

ABSTRACT OF THE DISCLOSURE

A process for the absorption of undesirable acidic gaseous effluents produced during the treatment of ores. The undesirable acidic gases, such as hydrogen sulfide, are introduced into an alkaline slurry grinding operation and absorbed therein thus eliminating the need for separate absorption columns or scrubbers.

DETAILED DISCLOSURE

This invention relates to a process for the absorption of undesirable gaseous effluents. More particularly, it relates to a process for the control and elimination of noxious acidic air pollutants, such as hydrogen sulfide and other acidic gases, which may be generated during the treatment of ores for the recovery of valuable mineral constituents. Noxious acidic gases may be evolved from a number of sources. For example, hydrogen sulfide may be evolved in the acid leaching of mineral bearing uranium ore. Hydrogen sulfide is also found in the flue gas of a furnace distilling sulfur from molybdenite flotation concentrate. Similarly, sulfur dioxide occurs in the flue gas of a dryer or roaster or other metallurgical furnace. Additional acidic gases which can be absorbed by the process of the present invention include hydrogen cyanide, hydrogen chloride, carbon dioxide, ethylene, nitric dioxide, etc.

In the metallurgical treatment of ore, for example, copper ores, it is known to apply a leach-precipitation-flotation process such as that described in U.S. Pat. No. 3,168,396, wherein sulfide reagents are added to acidic ore slurries. In this process, hydrogen sulfide is generated, some of which escapes from the process slurry stream into the plant atmosphere. As is well known, hydrogen sulfide is corrosive to plant equipment and, as a result of its characteristic odor, is highly offensive to personnel. Additionally, hydrogen sulfide, in high concentrations presents a health hazard. Noxious gases such as hydrogen sulfide may be collected from process vessels by means of hoods and ducts and conveyed to absorption columns or scrubbing towers where the hydrogen sulfide is removed from the carrier gas or air by absorption in liquid or solid chemical absorbents. Among the chemical absorbents which have been employed for this purpose are caustic soda (sodium hydroxide), soda ash (sodium carbonate), ammonium hydroxide, aliphatic amines and potassium permanganate. However, for an absorption column or scrubbing tower to remain effective, it is necessary to remove periodically or continuously all or a portion of the chemical absorbent and replace such absorbent with fresh or regenerated chemicals. The spent chemical absorbent must either be discraded or directed to a stripping system in which the noxious chemical is removed and the chemical absorbent regenerated for return to the absorption column. Under appropriate conditions, where the nature and quantity of the noxious gas are such that some form or product of it can be sold to offset a portion or all of the operating cost, the use of absorption columns may be desirable since they are highly effective when properly designed.

However, in metallurgical operations, the amount of the noxious gases to be absorbed are ordinarily insufficient to justify the production of a saleable noxious gas by-product. Furthermore, absorption column devices are characterized by relatively high capital costs, continuing charges for the replacement or regeneration of the chemical absorbent, operational problems resulting from the precipitation of solids in the absorption column or scrubber and continuing charges for operating and maintenance labor.

In the metallurgical treatment of ores, such as copper bearing ores, it is known to moisten the ore with an aqueous acid solution to convert the metal values to a soluble salt of the metal. A sulfide precipitant is added to the leach slurry so formed. During this leach-precipitation process noxious hydrogen sulfide is generated and the portion which escapes from the slurry is normally removed through ducts and fans to an absorption column or scrubber where chemical absorbents separate the noxious gases from the carrier air. The ore slurry itself is directed to a wet grinding mill, such as a ball mill or rod mill, where the slurry is ground with added lime to form an alkaline ore slurry in preparation for subsequent beneficiation by the flotation process. In accordance with my invention, I have discovered that the noxious acidic gases, such as hydrogen sulfide, may be absorbed without the use of absorption columns or scrubbers by directing the noxious gas into a grinding mill, which may be of the ball, rod pebble or autogenous type where it will be absorbed by the alkaline slurry present in the mill.

It is therefore an object of the present invention to provide a process for the absorption of undesirable gaseous effluents which does not require the use of conventional absorption columns or gas scrubbers.

A further object of the invention is to provide a process for the absorption of undesirable gaseous effluents in which the undesirable effluents are absorbed in portions of the process equipment required to perform other necessary parts of the metallurgical process.

A still further object of the invention is to provide a process for the absorption of undesirable gaseous effluents in which the undesirable effluent is absorbed during the wet grinding of an ore slurry.

A further object of the invention is to provide a process for the absorption of undesirable gaseous effluents in a wet grinding process so that the gas moving equipment following the wet grinding equipment need not incorporate acid proof ducts, blowers and the like, whereby the cost of the auxiliary equipment may be substantially reduced.

Further objects and advantages of the present invention will be apparent to those skilled in the art from the present description and the accompanying drawings, in which:

FIG. 1 is a block diagram illustrating schematically the treatment of ore as heretofore practiced including a leach-precipitation step, a noxious gas absorption step, and a wet grinding step to produce an ore slurry suitable for subsequent beneficiation;

FIG. 2 is a block diagram illustrating schematically the treatment of ore according to the present invention including a leach-precipitation step, and a wet grinding step with simultaneous absorption of noxious gases to procedure an ore slurry suitable for subsequent benefication;

Referring to FIG. 1, a leach-precipitation process followed by wet grinding, such as is disclosed in the Barker U.S. Pat. 3,168,396, supra, is shown. In this process, water, an acid and a sulfide precipitant are added to crushed ore in a leach-precipitation drum. Within the drum, the ore is leached, hydrogen sulfide is generated, mineral sulfides are precipitated and some noxious hydrogen sulfide escapes into the drum atmospher. The hydrogen sulfide laden carrier air is then withdrawn from the precipitation drum, cleaned in an absorption column or scrubber and discharged to the atmosphere, while the ore slurry is delivered to a wet grinding mill where it is ground with additional water and lime to form an ore slurry suitable for flotation processing.

FIG. 2 illustrates in a block digaram the process according to the present invention. Water, an acid and a sulfide precipitant are added to crushed ore in a leach-precipitation drum to produce leached ore, mineral sulfides and some noxious hydrogen sulfide. The noxious gas laden carrier gases, together with the leached ore and mineral sulfides are delivered to a wet grinding mill to which is added water and an alkaline reagent such as lime. During the wet grinding operation the noxious acidic gases are absorbed by the alkaline slurry within the mill so that the cleaned carrier gases may be withdrawn from the mill and discharged to the atmosphere while the ground ore slurry is withdrawn for further processing.

Figure 3:
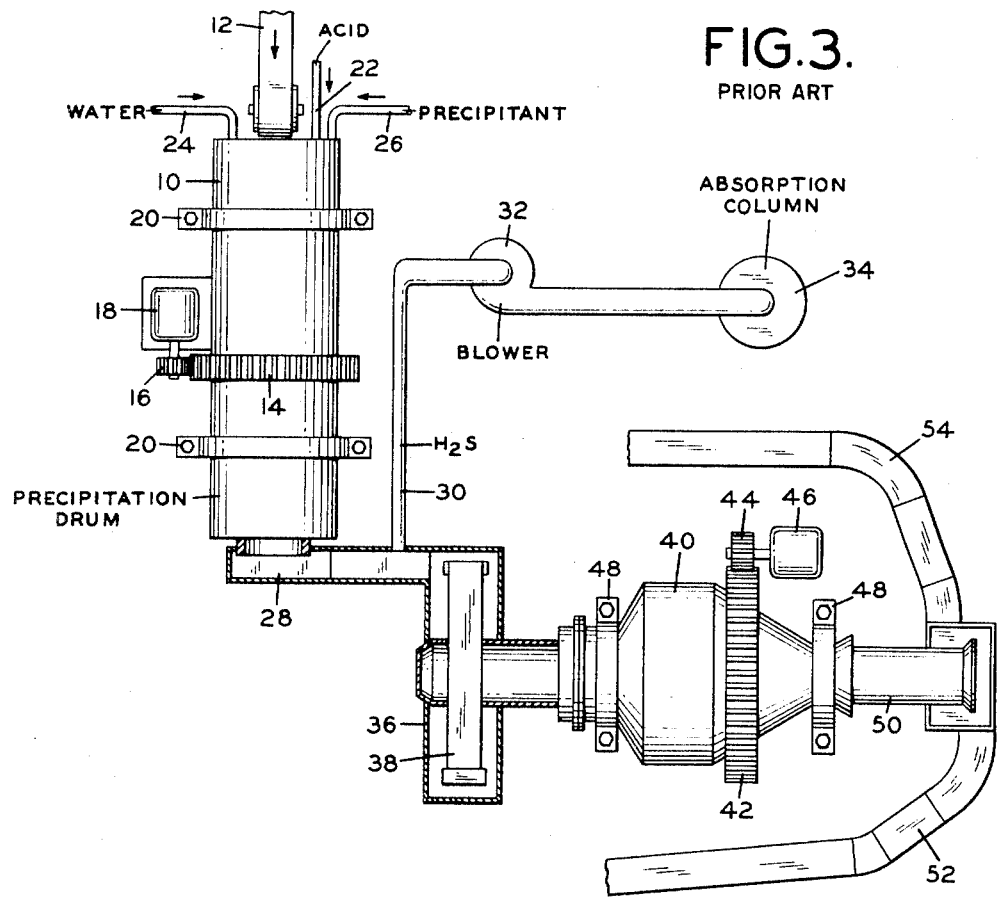
FIG. 3 is a plan view showing schematically the leach-precipitation-grinding process as heretofore practiced with the noxious effluent removed by an absorption column.
Figure 4:
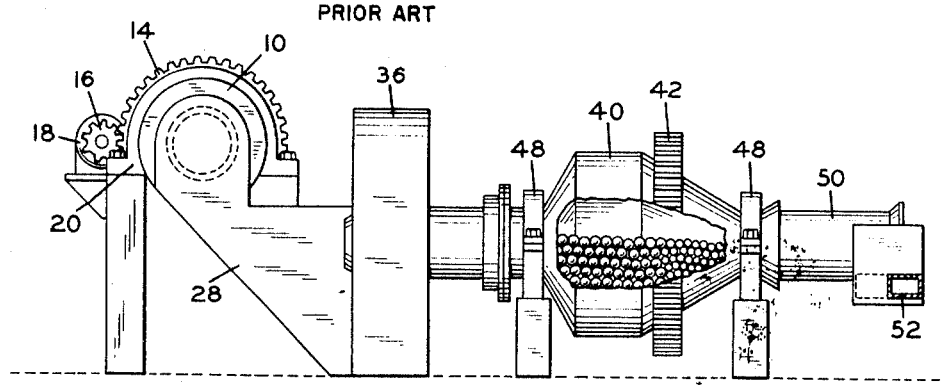
FIG. 4 is an elevation view of the equipment shown in FIG. 3.

Referring now to FIGS. 3 and 4 of the drawings, the leach-precipitation-grinding process for the treatment of ores as heretofore practiced will be described.

Ore, such as copper ore, is delivered to a horizontal rotating leach-precipitation drum 10 from a belt type conveyor 12 after having been crushed to a suitable size. The precipitation drum 10 is driven through a bull gear 14 externally mounted on the drum 10 which meshes with a pinion 16 driven by a suitable motor drive unit 18. The precipitation drum 10 is rotatably mounted in journals 20. A leaching solution ef sulfuric acid is introduced into the feed end of the drum at 22 and additional water is introduced at 24 to provide a slurry suitable for leaching and precipitation. The sulfide precipitant, in which, for example, calcium sulfide is essentially the active constituent, is also introduced at the feed end of the drum at 26. These chemicals enter into chemical reaction with the crushed ore within the drum 10 to liberate hydrogen sulfide gas, some of which can escape to the atmosphere from either end of the drum 10. In order to control the escape of the noxious hydrogen sulfide to the atmosphere an acid-proof hood or breeching 28 is provided for the discharge end of the leach-precipitation drum 10. An acid-proof duct 30 communicates with the hood 28 and an acid-proof blower 32 through which the hydrogen sulfide laden air from the leach-precipitation drum 10 is conveyed to an absorption column 34 which is charged with relatively expensive caustic soda (sodium hydroxide). Within the absorption column 34, the hydrogen sulfide is removed from the air and the cleaned air is thereafter exhausted to the atmosphere.

The leached ore and precipitated sulfide minerals flow from the leach-precipitation drum 10 into a scoop box 36 which communicates with the delivery end of the drum 10. Within the scoop box 36, a scoop 38 picks up the leached ore and precipitated sulfide minerals and delivers this material axially to a conventional rotating cylindrical grinding mill 40. The ball or rod mill 40 is driven through an external bull gear 42 and pinion 44 from a suitable motor drive 46 and rotates on suitable journals 48. Water and milk of lime are added to the scoop box 36 along with coarse ore rejected from the classifier (not shown) to maintain an alkalinity of the slurry within the mill equivalent to a pH of 11 to 12, which is suitable for the subsequent processing of the slurry. The mill 40 is desirably charged to about 50% of its volume with grinding media, which may be steel balls, steel rods, natural or synthetic pebbles, or large pieces of the ore itself. After passing through the mill 40 the ore slurry flows through the mill trunnion 50 and then through launders 52, 54 to a classifier (not shown).

Figure 5:
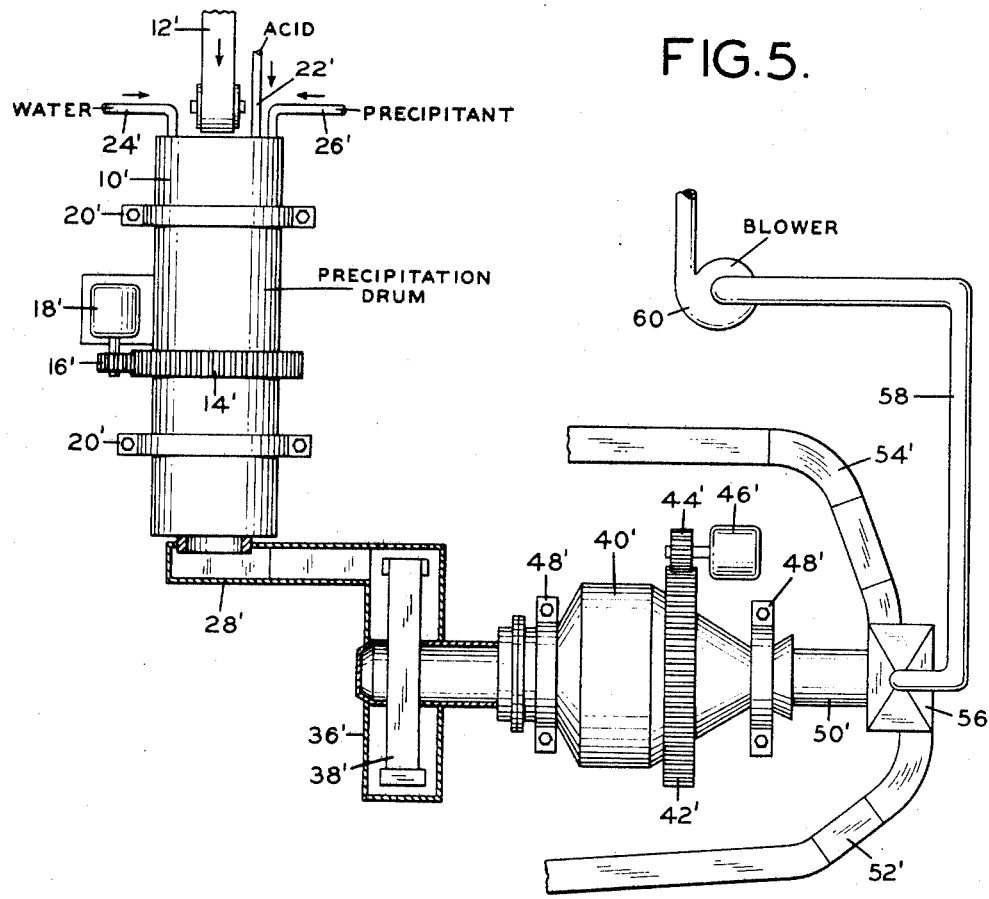
FIG. 5 is a plan view showing schematically the leach-precipitation-grinding process according to the present invention wherein the noxious gases generated in the leach-precipitation step are absorbed during the wet grinding step.
Figure 6:
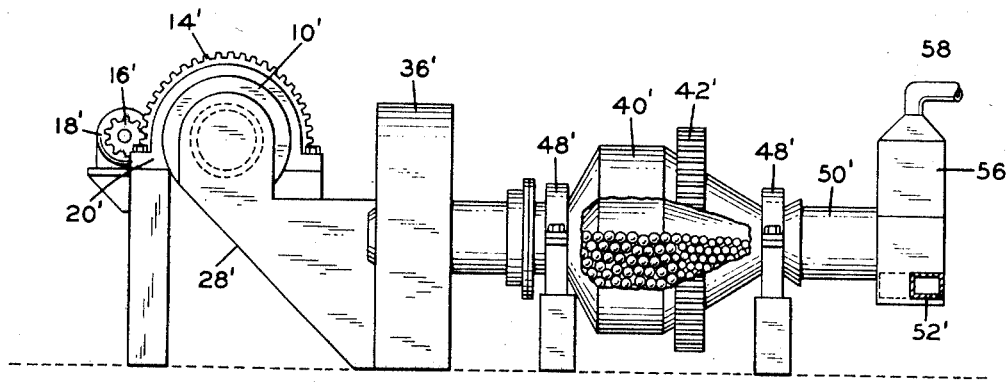
FIG. 6 is an elevation view of the equipment shown in FIG. 5.

Referring now to FIGS. 5 and 6, the leach-precipitation-grinding process with the addition of the present invention will be described.

Ore, such as copper ore, which may include acid soluble copper minerals associated with sulfide copper minerals together with acid insoluble gangue minerals, is delivered to a horizontal rotating leach-precipitation drum 10' from a conveyor 12' after having been crushed to a suitable size. Typically, the ore may contain about 0.77% sulfide copper and 0.13% oxide copper with a total copper content in the neighborhod of 0.90 to 1.10%. The precipitation drum 10' is driven through a bull gear 14' externally mounted on the drum 10' which meshes with a pinion 16' driven by a suitable motor drive unit 18'. The precipitation drum 10' is rotatably mounted in journals 20'. Concentrated sulfuric acid is introduced into the feed end of the drum at 22' and additional water is introduced at 24' to provide a slurry of about 24% moisture content which is suitable for leaching and precipitation and subsequent grinding. A sulfide precipitant, in which, for example, calcium sulfide is essentially the active constituent, is also introduced at the feed end of the drum at 26'. Typically, the precipitant of the type described in the Barker U.S. Pat. No. 3,168,396, supra, containing ferrous sulfide, calcium sulfide, calcium sulfate, iron oxide and calcium oxide, or the reduced precipitant described in the Barker patent containing ferrous sulfide, calcium sulfide, metallic iron and lime, may be added. As indicated above, hydrogen sulfide is generated within the precipitation drum 10' as a result of chemical reaction between the added chemicals and the crushed ore, and some escapes into the air within the drum. The hydrogen sulfide laden air passes from the drum 10' along with the leached ore and precipitated sulfide minerals into an acid-proof breeching 28' which communicates with a scoop box 36'. Within the scoop box 36', a scoop 38' picks up the leached ore and precipitated sulfide minerals and delivers this material together with the hydrogen sulfide laden air axially to a rotating cylindrical grinding mill 40' driven through an external bull gear 42' and pinion 44' from a suitable motor drive 46'. The mill 40' rotates on suitable journals 48'. Water and an alkaline reagent, such as lime (calcium oxide), milk of lime (calcium hydroxide) or soda ash (sodium carbonate), are added to the scoop box 36', along with coarse ore rejected from the classifier (not shown), to maintain an alkalinity of the slurry within the mill equivalent to a pH of at least 9 and preferably a pH of 11 to 12, which is suitable for the subsequent processing of the slurry. The mill is conventionally charged to about 50% of its volume with grinding media.

Within the grinding mill 40' the noxious hydrogen sulfide is almost completely removed from the gas stream by absorption in the slurry, which preferably contains such low cost alkaline reagents as lime (calcium oxide or calcium hydroxide) or soda ash (sodium carbonate). The conditions within the grinding mill 40' are ideally suited, both physically and chemically, for the absorption of acidic gases, such as hydrogen sulfide. Thus the extensive gas-liquid interfacial areas created by the splashing and tumbling of the grinding media within the mill and the exposure of the wetted media are conducive to rapid absorption of the acidic gas. Additionally, the alkalinity within the mill 40' resulting from the addition of alkali, such as lime or soda, is conducive to the removal of acidic gases such as hydrogen sulfide. It will be appreciated that the alkalinity, i.e. the pH level, required to absorb an acidic gas varies with the absorbent and the gas. For example, hydrogen sulfide may be absorbed at any pH above about 9.0 while the absorption of hydrogen cyanide requires a pH level above about 11.0. However, the absorption of sulfur dioxide can be accomplished at a pH level as low as about 8.0. As noted above, the pH level may be determined by extrinsic conditions such as the subsequent processing requirements of the ground slurry. Also, the pumping action of the scoop 38' creates a flow of the gas laden air through the grinding mill 40' and aids in providing an intermediate admixture between the acidic gases and the alkaline absorbent.

After passing through the mill 40', the ore slurry flows through the mill trunnion 50' and then through launders 52', 54' to a classifier (not shown). The cleaned air is withdrawn from the mill through a hood 56, a duct 58, a blower 60 and thence discharged to the atmosphere. Since the air emerging from the mill trunnion 50' contains substantially no corrosive hydrogen sulfide, it is unnecessary to provide acid-proof construction for the hood 56, duct 58 and blower 60. Also, the action of the blower 60 and the scoop 38' creates a flow of air through the precipitation drum 10', the breeching 28', the scoop box 36' and the mill 40' which tends to keep the hydrogen sulfide generated in the precipitation drum 10' within the equipment until it is absorbed in the mill 40'.

It will be apparent that the chemical reactions involved in the removal of the noxious hydrogen sulfide from the air within the mill 40' consume a portion of the lime or other alkaline reagent in proportion to the amount of hydrogen sulfide removed. However, in the process of the present invention less of the alkaline reagent is required than when an external absorption column is used. This is so because a portion of the solution for the absorption column must be removed continually for discard or regeneration and replaced by fresh make-up water or stripped solution of low alkalinity which must then be fortified with an alkaline reagent to raise the pH of the solution to an effective level. Since no absorption column is used in the process of the invention this alkaline reagent requirement is also eliminated. Also the alkaline reagents which may be used according to the present invention for the absorption of the noxious gases are relatively cheaper than those commonly employed in absorption columns or scrubbers, thereby decreasing the operating cost.

Since the products of the absorption reaction are automatically removed from the mill along with the slurry, no additional process steps with their attendant operating labor are required to discard or regenerate the gas absorption chemicals. Furthermore, since the grinding mill is ordinarily equipped with automatic controls to maintain the desired alkalinity within the mill, no additional control system or operating labor is required to handle the gas absorption reactions. Finally, it will be apparent that according to the present invention the noxious gases may be removed substantially at or close to the point where they are generated so that the possibility of uncontrolled leakage and pollution is substantially reduced while at the same time less expensive ducting and fans may be employed and the relatively expensive absorption column is eliminated entirely.

The effectiveness of the process for absorbing noxious hydrogen sulfide according to the present invention is shown by the following tests, using a Drager Gas Detector Sampler, of gas samples taken contemporaneously from the discharge of the leach-precipitation drum and the discharge of the ball mill:

| Test No. | Hydrogen sulfide concentration (p.p.m.) | |
|---|---|---|
| | Drum discharge | Ball mill discharge |
| 1 | 800 | 0 |
| 2 | 1,200 | 0 |
| 3 | ¹ 2,400+ | 50 |
| 4 | 2,000 | 0 |
| 5 | | 0 |
| 6 | 2,000 | 0 |
| 7 | ¹ 2,000+ | 0 |
| 8 | ¹ 2,000+ | Trace |
| 9 | ¹ 2,000+ | 30 |

¹ Exceeded capacity of measuring instrument.

In the specific embodiment of the invention described above, the noxious acidic gases were evolved in a process requiring a subsequent alkaline grinding operation. It will be appreciated that the invention is equally applicable to a process where the alkaline grinding operation precedes the stage in which the noxious gas is evolved. The invention may also be applied in situations where the noxious acidic gases are evolved in processes entirely separate from and unrelated to the alkaline grinding operation. In this event, the alkaline grinding operation may be utilized as a convenient means for absorbing noxious gases which otherwise would require separate conventional absorption columns or gas scrubbers.

The effectiveness of the present invention has also been demonstrated by tests involving the absorption of noxious sulfur dioxide generated from a source adjacent but unrelated to an alkaline slurry grinding operation. In this case, the noxious sulfur dioxide was introduced by means of a duct into the scoop box 36' of an alkaline slurry grinding operation. The grinding mill was fitted with a hood 56 and blower 60 essentially as shown in FIGS. 5 and 6 and the alkaline reagent used in the cylindrical grinding mill was lime. A Drager Gas Detector Sampler was used to measure the sulfur dioxide content of the carrier air entering the scoop box and the carrier air discharged from the blower. The results of these tests are shown in the table below together with the alkalinity of the ball mill discharge which was measured contemporaneously with the taking of the gas samples:

| Test No. | Sulfur dioxide concentration (p.p.m.) | | |
|---|---|---|---|
| | Ball mill feed | Blower discharge | pH ball mill |
| 1 | 800 | 0 | 9.0 |
| 2 | 1,500 | 0 | 9.8 |
| 3 | 750 | 0 | 9.2 |
| 4 | ¹ 2,000+ | 0 | 8.0 |

¹ Exceeded capacity of measuring instrument.

The sulfide dioxide absorbing tests demonstrated not only that the present process is effective for absorbing noxious acidic gases, but also that sulfur dioxide may be absorbed satisfactorily at alkalinity levels in the grinding mill as low as pH 8.0.

The terms and expressions employed are used as terms of description and not of limitation, and it is not intended in the use of such terms and expressions, to exclude any equivalents of the features shown and described or portions thereof, but it is recognized that various modifications are possible within the scope of the invention claimed.

What is claimed is:

1. In a leach-precipitation process for the recovery of metal from an ore by acid leaching and sulfide precipitation, the steps of introducing into a grinding mill a slurry of leached ore and sulfide minerals together with noxious acidic gaseous effluents and an alkaline reagent and simultaneously grinding said slurry while absorbing said noxious acidic gaseous effluents in said grinding mill.

2. The process defined in claim 1 wherein the alkaline reagent is a member of the class consisting of calcium oxide, calcium hydroxide and sodium carbonate.

3. The process defined in claim 1 wherein the noxious gas is hydrogen sulfide, the alkaline reagent is lime, and in which the alkalinity of the slurry within the grinding mill is maintained above about pH 9.

4. In a process for recovery of copper from an ore containing acid-soluble copper minerals associated with sulfide copper minerals, the steps comprising treating the ore with an aqueous acid leaching solution to form a slurry having a density suitable for grinding, adding to the slurry a sulfide precipitant, agitating the slurry to produce a slurry comprising leached ore and sulfide minerals together with noxious acidic gaseous effluents, introducing the treated slurry and the noxious acidic gaseous effluents together with alkaline reagents into a grinding mill and simultaneously grinding said slurry while absorbing said noxious acidic gaseous effluents in said grinding mill, said slurry within said grinding mill being maintained at an alkalinity above about pH 9.

5. The process defined in claim 4 in which the alkaline reagent is lime and in which the alkalinity of the slurry within the grinding mill is maintained above about pH 9.

References Cited

UNITED STATES PATENTS

| | | | |
|---|---|---|---|
| 3,376,102 | 4/1968 | Vene Mark | 23—2 |
| 3,168,396 | 2/1965 | Barker | 75—117 |
| 2,747,962 | 5/1956 | Heitz et al. | 23—2 |
| 2,094,070 | 9/1937 | Hultman et al. | 23—2 |

CARL D. QUARFORTH, Primary Examiner

M. J. McGREAL, Assistant Examiner

U.S. Cl. X.R.

23—4, 321, 322, 323; 75—108, 117

PO-1050
(5/69)

UNITED STATES PATENT OFFICE
CERTIFICATE OF CORRECTION

Patent No. 3,514,283            Dated May 26, 1970

Inventor(s) William A. Griffith

It is certified that error appears in the above-identified patent and that said Letters Patent are hereby corrected as shown below:

Column 2, line 35, there should be a comma (,) after the word "rod".

Column 3, line 5, "procedure" should be --produce--.

Column 3, lines 5 and 6, "benefication" should be --beneficiation--

Column 3, line 26, "atmospher" should be --atmosphere--.

Column 5, line 25, "intermediate" should be --intimate--.

SIGNED AND
SEALED
SEP 15 1970

(SEAL)
Attest:

Edward M. Fletcher, Jr.
Attesting Officer

WILLIAM E. SCHUYLER, JR.
Commissioner of Patents